US008831126B2

(12) United States Patent
Wu et al.

(10) Patent No.: US 8,831,126 B2
(45) Date of Patent: Sep. 9, 2014

(54) METHOD AND DEVICE FOR OBTAINING PRECODING MATRIX

(75) Inventors: Lu Wu, PuDong Jinqiao Shanghai (CN); Yang Song, PuDong Jinqiao Shanghai (CN); Jinhui Chen, PuDong Jinqiao Shanghai (CN); Hongwei Yang, PuDong Jinqiao Shanghai (CN); Di Lv, PuDong Jinqiao Shanghai (CN)

(73) Assignee: Alcatel Lucent, Boulogne Billancourt (FR)

( * ) Notice: Subject to any disclaimer, the term of this patent is extended or adjusted under 35 U.S.C. 154(b) by 0 days.

(21) Appl. No.: 13/704,071

(22) PCT Filed: Jun. 24, 2011

(86) PCT No.: PCT/IB2011/001777
§ 371 (c)(1),
(2), (4) Date: Dec. 13, 2012

(87) PCT Pub. No.: WO2012/014064
PCT Pub. Date: Feb. 2, 2012

(65) Prior Publication Data
US 2013/0089158 A1    Apr. 11, 2013

(30) Foreign Application Priority Data

Jun. 24, 2010   (CN) .......................... 2010 1 0208384

(51) Int. Cl.
*H04B 7/02* (2006.01)
*H04B 7/10* (2006.01)
*H04B 7/04* (2006.01)
*H04L 25/03* (2006.01)

(52) U.S. Cl.
CPC ............... *H04B 7/0456* (2013.01); *H04B 7/10* (2013.01); *H04L 25/03343* (2013.01); *H04L 2025/03802* (2013.01); *H04L 2025/03426* (2013.01); *H04B 7/0413* (2013.01); *H04B 7/0469* (2013.01)
USPC ....................................... 375/267

(58) Field of Classification Search
CPC ..... H04B 1/707; H03F 1/3247; H04L 1/0003; H04L 1/0618
See application file for complete search history.

(56) References Cited

U.S. PATENT DOCUMENTS

2006/0062319 A1\* 3/2006 Kloos ........................ 375/264
2009/0252091 A1   10/2009 Tang et al.
2011/0243098 A1\* 10/2011 Koivisto et al. ............. 370/335

FOREIGN PATENT DOCUMENTS

CN         101304301 A    11/2008
WO   WO 2010/021471 A2    2/2010

OTHER PUBLICATIONS

International Search Report for PCT/IB2011/001777 dated Jan. 19, 2012.

*Primary Examiner* — Leon-Viet Nguyen
(74) *Attorney, Agent, or Firm* — Fay Sharpe LLP

(57) ABSTRACT

The present invention provides a method and device for obtaining precoding matrix. A network apparatus comprises a plurality of groups of cross-polarized linear array antennas. The method comprises: obtaining first channel indicating information indicating a first code word; obtaining second channel indicating information indicating a second code word; determining the precoding matrix, according to the first channel indicating information and the second channel indicating information, the first code word and/or the second code word comprises phase shifts and/or amplitude differences among the plurality of groups of cross-polarized linear array antennas. Since the first code word and the second code word for determining the precoding matrix by the network apparatus comprise phase shifts and amplitude differences among cross-polarized linear array antennas, the phase shifts and amplitude differences among cross-polarized linear array antennas are considered when the network apparatus sends downlink data according to the precoding matrix, so as to be able to improve the receiving quality of the sent data, thereby improving the system performance effectively.

12 Claims, 2 Drawing Sheets

METHOD AND DEVICE FOR OBTAINING PRECODING MATRIX

FIELD OF THE INVENTION

The present invention relates to wireless communication, especially to method and device for obtaining precoding matrix.

BACKGROUND OF THE INVENTION

In closed-loop Multiple Input Multiple Output (MIMO) system, receiver needs to feed channel information back to transmitter for the transmitting data signal during communication.

Considering a MIMO system with Nt transmitting antennas and Nr receiving antennas, Mt denotes the number of space multiplex data flows to be sent, vector x of Mt×1 denotes the signal carried by the data flows, the precoding matrix W is a Nt×Mt dimensional matrix, which transforms vector x into Nt×1 dimensional vector z:

$$z = Wx$$

Vector z is actual signal transmitted by transmitting antenna. The signal received by receiving antenna is denoted as:

$$r = HWx + n$$

Wherein, H denotes channel matrix, n denotes Gaussian white noise vector.

If feedback overhead is not considered, the optimal choice of W is right singular vector of Matrix H. However, the cost of feedback of these singular vectors is great. Therefore, a solution of closed-loop MIMO precoding with limited feedback is proposed. A group of precoding matrixes or vectors are structured for each transmitting antenna dimension, and this group of precoding matrixes or vectors (called as matrix below) are called as "codebook". Both base station and mobile station are enabled to know this codebook, which is denoted as $P = \{P_1, \ldots, P_L\}$, in which each matrix is called as a "code word". If $L = 2^q$ denotes the size of codebook, q is the required bit number for indexing the codebook. Take an 4×2 MIMO system as an example, for a codebook with size L=64, only 6 bits information is needed to feed back for the transmitter to select precoding matrix. After the codebook of a MIMO system is determined, the receiver detects the channel and selects the optimal code word (precoding matrix) for the present moment, and then the index of the code word is fed back to the transmitter. The MIMO system may save a plenty of feedback overhead by means of such limited codebook index feedback.

The MIMO system may also use a limited feedback solution of feeding back quantized channel matrix codebook index, that is: quantized channel matrix codebook is structured in advance and stored at the transmitter and receiver; the receiver detects the channel and selects the optimal code word for the present moment from the quantized channel matrix codebook and feeds back the index of the code word; the transmitter determines present channel transmission matrix according to the code word corresponding to the index, and then calculates the optimal precoding matrix for data transmission according to present channel transmission matrix.

In 3GPP RAN1 discussion, it has been agreed about the feedback of channel information in LTE-A (Long Term Evolution system-Advanced) system that: two code words may be respectively selected from two separate codebooks and reported to the base station, when the mobile terminal feeds the precoding matrix back to the base station. In the two code words, one is used for representing wideband and/or long-term channel properties; the other is used for representing frequency-selective (such as a sub-band) and/or short-term channel properties. The base station obtains the precoding matrix according to the product of the two code words. The user terminal may determine the code word for representing wideband and/or long-term channel properties according to capacity maximization principle or the principle of minimum distance of eigenvector of channel correlation matrix, and then determine the code word for representing frequency selective (such as a sub-band) and/or short-term channel properties according to real-time channel condition.

In practice, cross-polarized linear array (CLA) is a typical manner of antenna configuration. Antenna polarization represents the direction of electric field strength formed during antenna radiation. The electrical wave is called as vertically polarized wave if the direction of electric field strength is perpendicular to ground; the electrical wave is called as horizontal polarized wave if the direction of electric field strength is parallel to ground. Cross-polarized antenna is one kind of dual-polarized antenna.

SUMMARY OF THE INVENTION

The inventor of the present invention is aware that all of present codebooks do not consider polarization performance of cross-polarized linear array antenna, that is, due to relative phase shifts and amplitude differences among different polarized antennas, big error may possibly exist in feedback of channel information, so as to influence the system performance. For cross-polarized linear array antenna, when the mobile terminal feeds precoding matrix back to the base station, if polarization performance of cross-polarized linear array antenna is considered in the transmitting of code word, the precoding matrix determined by the base station may reflect downlink channel information more accurately so as to improve system performance effectively.

In order to better address the aforesaid technical problem, a method, in a network apparatus, of obtaining precoding matrix is provided according to one embodiment of the first aspect of the present invention. The network apparatus comprises a plurality of groups of cross-polarized linear array antennas. The method comprises following steps:

obtaining first channel indicating information indicating a first code word;

obtaining second channel indicating information indicating a second code word; and determining the precoding matrix, according to the first channel indicating information and the second channel indicating information, wherein the first code word and/or the second code word comprises phase shifts and amplitude differences among the plurality of groups of cross-polarized linear array antennas.

Since the first code word and the second code word for determining the precoding matrix by the network apparatus comprise phase shifts and amplitude differences among cross-polarized linear array antennas, the phase shifts and amplitude differences among cross-polarized linear array antennas are considered when the network apparatus sends downlink data according to the precoding matrix, so as to be able to improve the receiving quality of the sent data to improve the system performance effectively.

A method, in a user terminal equipment, of providing a network apparatus with a precoding matrix is provided according to one embodiment of the second aspect of the present invention. The precoding matrix is obtained according to a first code word and a second code word, the network apparatus comprises a plurality of groups of cross-polarized linear array antennas, the method comprises following steps:

sending first channel indicating information indicating a first code word;

sending second channel indicating information indicating a second code word;

wherein the first code word and/or the second code word comprises phase shifts and/or amplitude differences among the plurality of groups of cross-polarized linear array antennas.

Since the first code word and the second code word sent by the user terminal equipment comprise phase shifts and amplitude differences among cross-polarized linear array antennas, the phase shifts and amplitude differences among cross-polarized linear array antennas are considered when the network apparatus determines downlink data according to the first code word and the second code word. Therefore, the phase shifts and amplitude differences among cross-polarized linear array antennas are considered when the network apparatus sends downlink data according to the precoding matrix, so as to be able to improve the receiving quality of the sent data, thereby improving the system performance effectively.

An obtaining device, in a network apparatus, for obtaining a precoding matrix is provided according to one embodiment of the third aspect of the present invention. The network apparatus comprises a plurality of groups of cross-polarized linear array antennas. The obtaining device comprises:

a first means, for obtaining first channel indicating information indicating a first code word;

a second means, for obtaining second channel indicating information indicating a second code word; and a third means, for determining the precoding matrix, according to the first channel indicating information and the second channel indicating information, wherein the first code word and/or the second code word comprises phase shifts and/or amplitude differences among the plurality of groups of cross-polarized linear array antennas.

A providing device, in a user terminal equipment, for providing a network apparatus with a precoding matrix is provided according to one embodiment of the fourth aspect of the present invention. The precoding matrix is obtained according to a first code word and a second code word, the network apparatus comprises a plurality of groups of cross-polarized linear array antennas, the providing device comprises:

a fourth means, for sending first channel indicating information indicating the first code word; and a fifth means, for sending second channel indicating information indicating the second code word;

wherein, the first code word and/or the second code word comprises phase shifts and/or amplitude differences among the plurality of groups of cross-polarized linear array antennas.

Each aspect of the present invention will become more apparent from description of the following detailed embodiments.

BRIEF DESCRIPTION OF THE DRAWINGS

Aforesaid and other features of the present invention will become more apparent from reading the following detailed description of non-limiting exemplary embodiments taken in conjunction with the accompanying drawings.

In drawings, same or similar reference signs refer to the same or similar component.

DETAILED DESCRIPTION OF EMBODIMENTS

In the followings, the present invention is described in detail with reference to the drawings.

Figure 1:
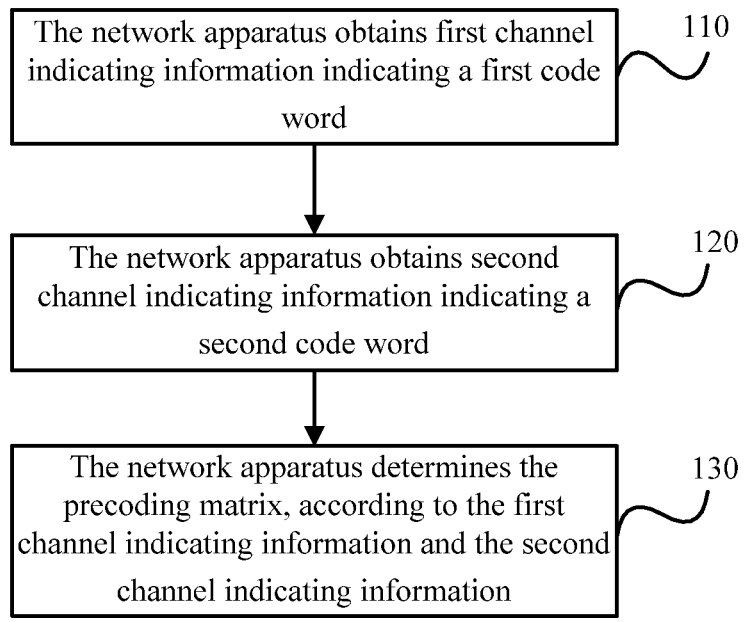
FIG. 1 is a flow chart of the method, in a network apparatus, of obtaining precoding matrix, according to one embodiment of the present invention.

FIG. 1 is a flow chart of the method, in a network apparatus, of obtaining precoding matrix, according to one embodiment of the present invention.

A method, in a network apparatus, of obtaining precoding matrix is provided according to one embodiment of the first aspect of the present invention. The network apparatus comprises a plurality of groups of cross-polarized linear array antennas.

The network apparatus may be implemented via a plurality of ways, such as base station, relay station, radio network controller, etc. Downlink channel refers to the channel for receiving signals by user terminals.

Referring to FIG. 1, the method comprises step 110, the network apparatus obtains first channel indicating information indicating a first code word.

The network apparatus may obtain first channel indicating information via a plurality of ways. For example, the network apparatus directly receives first channel indicating information from user terminal equipment. Or the network apparatus receives first channel indicating information from other network apparatuses.

The first channel indicating information may indicate a first code word via a plurality of ways. In one embodiment, bit number of the first channel indicating information decides the number of code words that may be indicated. For example, there are four code words in a codebook, and the first channel indicating information needs two bits to indicate first code word.

The method further comprises step 120, the network apparatus obtains second channel indicating information indicating a second code word.

The network apparatus may obtain the second channel indicating information via a plurality of ways. For example, the network apparatus directly receives second channel indicating information from the user terminal equipment. Or the network apparatus receives second channel indicating information from other network apparatuses.

The second channel indicating information may indicate the second code word via a plurality of ways. In one embodiment, bit number of second channel indicating information decides the number of code words that may be indicated. For example, there are eight code words in a codebook, and the second channel indicating information needs three bits to indicate the second code word.

The method further comprises step 130, the network apparatus determines the precoding matrix, according to the first channel indicating information and the second channel indicating information.

The network apparatus may determine the precoding matrix via a plurality of ways. In one embodiment, the network apparatus takes the product of the first code word and the second code word as the precoding matrix.

The first code word and/or the second code word comprises phase shifts and/or amplitude differences among the plurality of groups of cross-polarized linear array antennas, that is, the first code word and/or the second code word considers phase shifts and/or amplitude differences among the plurality of groups of cross-polarized linear array antennas. Since the first code word and the second code word for determining the precoding matrix by the network apparatus comprise phase shifts and amplitude differences among cross-polarized linear array antennas, the phase shifts and amplitude differences among cross-polarized linear array antennas are considered when the network apparatus sends downlink data according to the precoding matrix, so as to be able to improve the receiving quality of the sent data, to improve the system performance effectively.

The first code word and the second code word may comprise phase shifts and/or amplitude differences among the plurality of groups of cross-polarized linear array antennas via a plurality of ways.

In one embodiment, the plurality of groups of cross-polarized linear array antennas are two groups of single stream antennas, the first code word is obtained via formula 1 and the matrix $d_1$, and the second code word is obtained via formula 2 and the matrix $d_2$. Single stream antenna denotes the antenna only sending one data stream.

$$w_1 = d_1 w_3 \qquad \text{formula 1}$$
$$d_1 = \text{diag}[\underbrace{1, \ldots, 1}_{N}, \underbrace{a_1, \ldots, a_1}_{N}]$$

$$w_2 = d_2 w_4 \qquad \text{formula 2}$$
$$d_2 = \text{diag}[\underbrace{1, \ldots, 1}_{N}, \underbrace{a_2, \ldots, a_2}_{N}]$$

In aforesaid formulas and matrixes, $w_1$ is the first code word, $w_3$ is a third code word which does not comprise the phase shifts and/or amplitude differences among the plurality of groups of cross-polarized linear array antennas, $w_2$ is the second code word, $w_4$ is a fourth code word which does not comprise the phase shifts and/or amplitude differences among the plurality of groups of cross-polarized linear array antennas, N is antenna number of each group of antennas, $a_1$ and $a_2$ are the phase shifts and/or amplitude differences between two groups of cross-polarized linear array antennas. diag denotes a diagonal matrix.

Both the third code word and the fourth code word do not consider the phase shifts and/or amplitude differences between two groups of cross-polarized linear array antennas, for example code words in codebook in 3GPP TS 36.211 V8.8.0.

Which code word comprises phase shifts and amplitude differences may be determined according to sending frequency of the first code word and the second code word and signaling load of system. Detailed value of phase shifts and amplitude differences may be determined according to detailed wireless application environment. For example, the values of phase shifts and amplitude differences which may make the system performance better are determined via simulating the system performance under wireless application environment, and all of those skilled in the art should know corresponding simulation methods, which is not repeated here.

In one embodiment, $$a_1 = 1, a_2 \in \{1, -1, e^{j\frac{\pi}{4}}, e^{-j\frac{\pi}{4}}\}.$$

Supposing $w_3$ needs four bits of information to indicate, and $w_4$ needs two bits of information to indicate, then $w_1$ still needs four bits of information to indicate, $w_2$ comprises phase shift and needs four bits of information to indicate. In contrast with the known method, the signaling load of information indicating the second code word will increase.

In another embodiment, $a_1 \in \{re^{j\Theta}|r\in\{0.2, 0.5, 1, 2\}, \Theta\in\{0, \pi, \pi/4, -\pi/4\}\}$, $a_2 = 1$. Supposing $w_3$ needs four bits of information to indicate, and $w_4$ needs two bits of information to indicate, then $w_1$ comprises phase shifts and amplitude differences and needs eight bits of information to indicate, $w_2$ still needs two bits of information to indicate. In contrast with the known method, the signaling load of information indicating the first code word will increase.

In still another embodiment, $a_1 \in \{0.2, 0.5, 1, 2\}$, $$a_2 \in \{1, -1, e^{j\frac{\pi}{4}}, e^{-j\frac{\pi}{4}}\}.$$

Supposing $w_3$ needs four bits of information to indicate, and $w_4$ needs two bits of information to indicate, then $w_1$ comprises amplitude differences and needs six bits of information to indicate, $w_2$ comprises phase shifts and needs four bits of information to indicate. In contrast with the known method, the signaling load of both information indicating the first code word and the second code word will increase.

In still another embodiment, $a_1 = 1$, $a_2 \in \{re^{j\Theta}|r\in\{0.2, 0.5, 1, 2\}, \Theta\in\{0, \pi, \pi/4, -\pi/4\}\}$. Supposing $w_3$ needs four bits of information to indicate, and $w_4$ needs two bits of information to indicate, then $w_1$ still needs four bits of information to indicate, $w_2$ comprises phase shifts and amplitude differences and needs six bits of information to indicate. In contrast with the known method, the signaling load of information indicating the second code word will increase.

In one embodiment, the plurality of groups of cross-polarized linear array antennas are two groups of two-stream antennas, the first code word is obtained via formula 3, matrix $d_{11}$ and matrix $d_{12}$, the second code word is obtained via formula 4 and matrix $d_2$. Two-stream antenna denotes the antenna sending two data streams synchronously.

$$w_1 = [d_{11} w_{31}, d_{12} w_{32}] \qquad \text{formula 3}$$
$$d_{11} = \text{diag}[\underbrace{1, \ldots, 1}_{N}, \underbrace{a_1, \ldots, a_1}_{N}],$$
$$d_{12} = \text{diag}[\underbrace{a_1^*, \ldots, a_1^*}_{N}, \underbrace{1, \ldots, 1}_{N}]$$

$$w_2 = d_2 w_4 \qquad \text{formula 4}$$
$$d_2 = \text{diag}[\underbrace{1, \ldots, 1}_{N}, \underbrace{a_2, \ldots, a_2}_{N}],$$

In aforesaid formulas and matrixes, $w_1$ is the first code word, $[w_{31}, w_{32}]$ is a third code word which does not comprise the phase shifts and/or amplitude differences among the plurality of groups of cross-polarized linear array antennas, $w_2$ is the second code word, $w_4$ is a fourth code word which does not comprise the phase shifts and/or amplitude differences among the plurality of groups of cross-polarized linear array antennas, N is antenna number of each group of antennas, $a_1$ and $a_2$ are the phase shifts and/or amplitude differences between two groups of cross-polarized linear array antennas. diag denotes a diagonal matrix. * denotes conjugation.

Both the third code word and the fourth code word do not consider the phase shifts and/or amplitude differences between two groups of cross-polarized linear array antennas.

In aforesaid plurality of embodiments, the first code word may be code word for representing wideband and/or long-term channel properties, and the second code word may be code word for representing frequency selective (such as a sub-band) and/or short-term channel properties; or, the second code word may be code word for representing wideband and/or long-term channel properties, the first code word may be code word for representing frequency selective (such as a sub-band) and/or short-term channel properties.

In addition, other code words in a codebook may also use aforesaid method to comprise the phase shifts and/or amplitude differences among the plurality of groups of cross-polarized linear array antennas.

Figure 2:
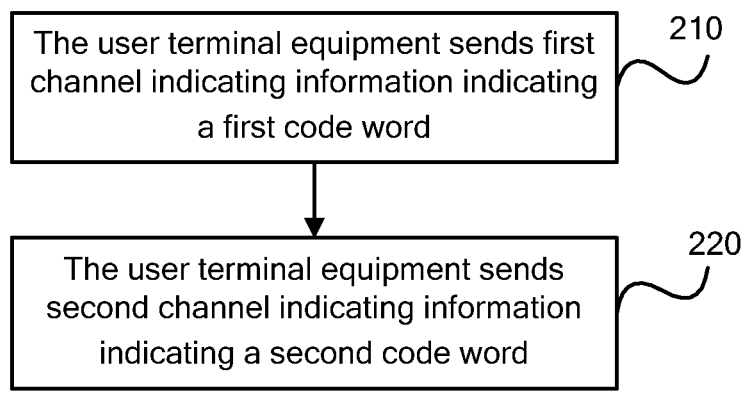
FIG. 2 is a flow chart of the method, in a user terminal equipment, of providing a network apparatus with a precoding matrix, according to one embodiment of the present invention.

FIG. 2 is a flow chart of the method, in a user terminal equipment, of providing a network apparatus with a precoding matrix, according to one embodiment of the present invention.

A method, in a user terminal equipment, of providing a network apparatus with a precoding matrix is provided according to one embodiment of the second aspect of the present invention. The precoding matrix is obtained according to a first code word and a second code word, the network apparatus comprises a plurality of groups of cross-polarized linear array antennas. A user terminal equipment may be implemented via a plurality of ways, such as handset, notebook computer, etc.

Referring to FIG. 2, the method comprises step 210, the user terminal equipment sends first channel indicating information indicating a first code word.

The method further comprises step 220, the user terminal equipment sends second channel indicating information indicating a second code word.

Both the first code word and the second code word are respectively selected from two separate codebooks by the user terminal equipment. The user terminal may determine the code word for representing wideband and/or long-term channel properties according to capacity maximization principle or the principle of minimum distance of eigenvector of channel correlation matrix, and then determine the code word for representing frequency selective (such as a sub-band) and/or short-term channel properties according to real-time channel condition. Those skilled in the art know the detailed selection method, which is not repeated here.

The first code word and/or the second code word comprises phase shifts and/or amplitude differences among the plurality of groups of cross-polarized linear array antennas, that is, the first code word and/or the second code word considers phase shifts and/or amplitude differences among the plurality of groups of cross-polarized linear array antennas. Since the first code word and the second code word sent by the user terminal equipment comprise phase shifts and amplitude differences among cross-polarized linear array antennas, the phase shifts and amplitude differences among cross-polarized linear array antennas are considered when the network apparatus determines the precoding matrix according to the first code word and the second code word. Therefore, the phase shifts and amplitude differences among cross-polarized linear array antennas are considered when the network apparatus sends downlink data according to the precoding matrix, so as to be able to improve the receiving quality of the sent data, thereby improving the system performance effectively.

The first code word and the second code word may comprise phase shifts and/or amplitude differences among the plurality of groups of cross-polarized linear array antennas via a plurality of ways.

In one embodiment, the plurality of groups of cross-polarized linear array antennas are two groups of single stream antennas, the first code word is obtained via aforesaid formula 1 and the matrix $d_1$, and the second code word is obtained via aforesaid formula 2 and the matrix $d_2$.

In another embodiment, the plurality of groups of cross-polarized linear array antennas are two groups of two-stream antennas, the first code word is obtained via formula 3, matrix $d_{11}$ and matrix $d_{12}$, and the second code word is obtained via formula 4 and matrix $d_2$.

Figure 3:
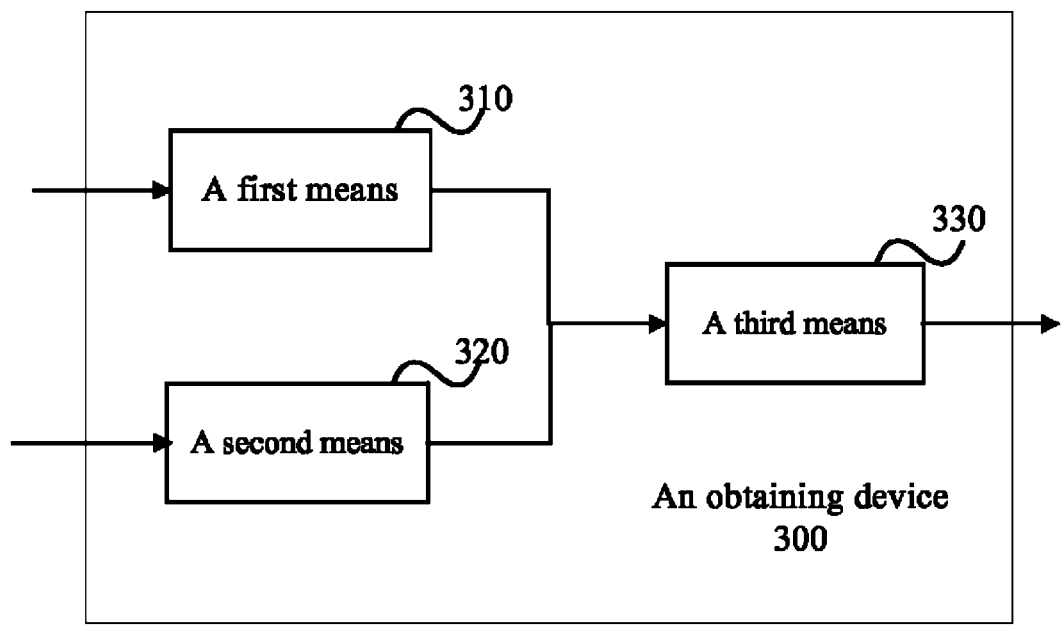
FIG. 3 is a schematic diagram of an obtaining device for obtaining a precoding matrix, according to embodiment of one aspect of the present invention.

FIG. 3 is a schematic diagram of an obtaining device for obtaining a precoding matrix, according to embodiment of one aspect of the present invention.

An obtaining device, in a network apparatus, for obtaining a precoding matrix is provided according to one embodiment of the third aspect of the present invention. The network apparatus comprises a plurality of groups of cross-polarized linear array antennas.

Referring to FIG. 3, the obtaining device 300 comprises a first means 310, a second means 320 and a third means 330.

The first means 310 is used for obtaining first channel indicating information indicating a first code word.

The second means 320 is used for obtaining second channel indicating information indicating a second code word; and The third means 330 is used for determining the precoding matrix, according to the first channel indicating information and the second channel indicating information.

The first code word and/or the second code word comprise phase shifts and/or amplitude differences among the plurality of groups of cross-polarized linear array antennas.

The first code word and the second code word may comprise phase shifts and/or amplitude differences among the plurality of groups of cross-polarized linear array antennas via a plurality of ways.

In one embodiment, the plurality of groups of cross-polarized linear array antennas are two groups of single stream antennas, the first code word is obtained via aforesaid formula 1 and the matrix $d_1$, the second code word is obtained via aforesaid formula 2 and the matrix $d_2$.

In another embodiment, the plurality of groups of cross-polarized linear array antennas are two groups of two-stream antennas, the first code word is obtained via formula 3, matrix $d_{11}$ and matrix $d_{12}$, the second code word is obtained via formula 4 and matrix $d_2$.

Figure 4:
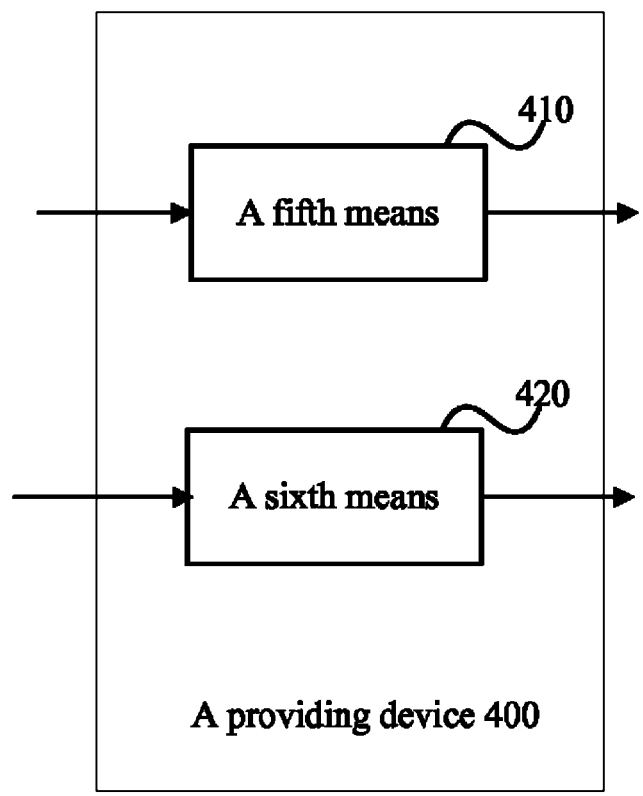
FIG. 4 is a schematic diagram of a providing device for providing a precoding matrix, according to one embodiment of one aspect of the present invention.

FIG. 4 is a schematic diagram of a providing device for providing a precoding matrix, according to one embodiment of one aspect of the present invention.

A providing device, in a user terminal equipment, for providing a network apparatus with a precoding matrix is provided according to one embodiment of the fourth aspect of the present invention. The precoding matrix is obtained according to a first code word and a second code word, the network apparatus comprises a plurality of groups of cross-polarized linear array antennas.

Referring to FIG. 4, the providing device 400 comprises a fourth means 410 and a fifth means 420.

The fourth means 410 is used for sending first channel indicating information indicating a first code word.

The fifth means 420 is used for sending second channel indicating information indicating a second code word.

The first code word and/or the second code word comprises phase shifts and/or amplitude differences among the plurality of groups of cross-polarized linear array antennas.

The first code word and the second code word may comprise phase shifts and/or amplitude differences among the plurality of groups of cross-polarized linear array antennas via a plurality of ways.

In one embodiment, the plurality of groups of cross-polarized linear array antennas are two groups of single stream antennas, the first code word is obtained via aforesaid formula 1 and the matrix $d_1$, and the second code word is obtained via aforesaid formula 2 and the matrix $d_2$.

In another embodiment, the plurality of groups of cross-polarized linear array antennas are two groups of two-stream antennas, the first code word is obtained via formula 3, matrix $d_{11}$ and matrix $d_{12}$, the second code word is obtained via formula 4 and matrix $d_2$.

For the skilled in the art, it is obvious that the present invention is not limited to the details of the above exemplary embodiments, and the present invention can be realized in other specific forms without departing from the spirit or basic features of the present invention. Therefore, in whatever aspects, the embodiments should be regarded as illustrative and non-limiting, any reference signs in the claims should not be regarded as limiting the involved claims. Further, it is obvious that the term "comprise" does not exclude other elements or steps, the term "a/an" preceding an element does not exclude a plurality of such elements. The plurality of elements described in product claims may be implemented by an element via hardware or software. The terms such as "first", "second" are used to represent the name rather than any specific order.

The invention claimed is:

1. A method, in a network apparatus, of obtaining a precoding matrix, the network apparatus comprising a plurality of groups of cross-polarized linear array antennas, wherein the method comprises:
   obtaining first channel indicating information indicating a first code word;
   obtaining second channel indicating information indicating a second code word; and
   determining the precoding matrix, according to the first channel indicating information and the second channel indicating information,
   wherein the first code word and/or the second code word comprises phase shifts and amplitude differences among the plurality of groups of cross-polarized linear array antennas,
   the first code word is obtained via a formula including a third code word which does not comprise the phase shifts and amplitude differences among the plurality of groups of cross-polarized linear array antennas, and
   the second code word is obtained via a formula including a fourth code word which does not comprise the phase shifts and amplitude differences among the plurality of groups of cross-polarized linear array antennas.

2. The method according to claim 1, wherein the plurality of groups of cross-polarized linear array antennas are two groups of single stream antennas, the first code word and the second code word are obtained via following formulas:

$$w_1 = d_1 w_3, \quad d_1 = \mathrm{diag}[\underbrace{1,\ldots,1}_{N},\underbrace{a_1,\ldots,a_1}_{N}]; \text{ and}$$

$$w_2 = d_2 w_4, \quad d_2 = \mathrm{diag}[\underbrace{1,\ldots,1}_{N},\underbrace{a_2,\ldots,a_2}_{N}],$$

wherein, $w_1$ is the first code word, $w_3$ is a third code word which does not comprise the phase shifts and/or amplitude differences among the plurality of groups of cross-polarized linear array antennas, $w_2$ is the second code word, $w_4$ is a fourth code word which does not comprise the phase shifts and/or amplitude differences among the plurality of groups of cross-polarized linear array antennas, N is antenna number of each group of antennas, $a_1$ and $a_2$ are the phase shifts and/or amplitude differences.

3. The method according to claim 1, wherein the plurality of groups of cross-polarized linear array antennas are two groups of two-stream antennas, the first code word and the second code word are obtained via following formulas:

$$w_1 = [d_{11} w_{31}, d_{12} w_{32}],$$

$$d_{11} = \mathrm{diag}[\underbrace{1,\ldots,1}_{N},\underbrace{a_1,\ldots,a_1}_{N}],$$

$$d_{12} = \mathrm{diag}[\underbrace{a_1^*,\ldots,a_1^*}_{N},\underbrace{1,\ldots,1}_{N}];$$

and $$w_2 = d_2 w_4, \quad d_2 = \mathrm{diag}[\underbrace{1,\ldots,1}_{N},\underbrace{a_2,\ldots,a_2}_{N}],$$

wherein, $w_1$ is the first code word, $[w_{31}, w_{32}]$ is a third code word which does not comprise the phase shifts and/or amplitude differences among the plurality of groups of cross-polarized linear array antennas, $w_2$ is the second code word, $w_4$ is a fourth code word which does not comprise the phase shifts and/or amplitude differences among the plurality of groups of cross-polarized linear array antennas, N is antenna number of each group of antennas, $a_1$ and $a_2$ are the phase shifts and/or amplitude differences.

4. A method, in a user terminal equipment, of providing a network apparatus with a precoding matrix, wherein the precoding matrix is obtained according to a first code word and a second code word, the network apparatus comprises a plurality of groups of cross-polarized linear array antennas, the method comprises:
   sending first channel indicating information indicating a first code word;
   sending second channel indicating information indicating a second code word; and
   wherein the first code word and/or the second code word comprises phase shifts and/or amplitude differences among the plurality of groups of cross-polarized linear array antennas,
   the first code word is obtained via a formula including a third code word which does not comprise the phase shifts and amplitude differences among the plurality of groups of cross-polarized linear array antennas, and
   the second code word is obtained via a formula including a fourth code word which does not comprise the phase shifts and amplitude differences among the plurality of groups of cross-polarized linear array antennas.

5. The method according to claim 4, wherein the plurality of groups of cross-polarized linear array antennas are two groups of single stream antennas, the first code word and the second code word are obtained via following formulas:

$$w_1 = d_1 w_3, \quad d_1 = \text{diag}[\underbrace{1, \ldots, 1}_{N}, \underbrace{a_1, \ldots, a_1}_{N}]; \text{ and}$$

$$w_2 = d_2 w_4, \quad d_2 = \text{diag}[\underbrace{1, \ldots, 1}_{N}, \underbrace{a_2, \ldots, a_2}_{N}],$$

wherein $w_1$ is the first code word, $w_3$ is a third code word which does not comprise the phase shifts and/or amplitude differences among the plurality of groups of cross-polarized linear array antennas, $w_2$ is the second code word, $w_4$ is a fourth code word which does not comprise the phase shifts and/or amplitude differences among the plurality of groups of cross-polarized linear array antennas, N is antenna number of each group of antennas, $a_1$ and $a_2$ are the phase shifts and/or amplitude differences.

6. The method according to claim 4, wherein the plurality of groups of cross-polarized linear array antennas are two groups of two-stream antennas, the first code word and the second code word are obtained via following formulas:

$$w_1 = [d_{11} w_{31}, d_{12} w_{32}],$$

$$d_{11} = \text{diag}[\underbrace{1, \ldots, 1}_{N}, \underbrace{a_1, \ldots, a_1}_{N}],$$

$$d_{12} = \text{diag}[\underbrace{a_1^*, \ldots, a_1^*}_{N}, \underbrace{1, \ldots, 1}_{N}];$$

and $$w_2 = d_2 w_4, \quad d_2 = \text{diag}[\underbrace{1, \ldots, 1}_{N}, \underbrace{a_2, \ldots, a_2}_{N}],$$

wherein, $w_1$ is the first code word, $[w_{31}, w_{32}]$ is a third code word which does not comprise the phase shifts and/or amplitude differences among the plurality of groups of cross-polarized linear array antennas, $w_2$ is the second code word, $w_4$ is a fourth code word which does not comprise the phase shifts and/or amplitude differences among the plurality of groups of cross-polarized linear array antennas, N is antenna number of each group of antennas, $a_1$ and $a_2$ are the phase shifts and/or amplitude differences.

7. An obtaining device, in a network apparatus, for obtaining a precoding matrix, the network apparatus comprising a plurality of groups of cross-polarized linear array antennas, the obtaining device comprises:
a processing element configured to obtain first channel indicating information indicating a first code word, obtain second channel indicating information indicating a second code word, and determine the precoding matrix, according to the first channel indicating information and the second channel indicating information,
wherein the first code word and/or the second code word comprises phase shifts and amplitude differences among the plurality of groups of cross-polarized linear array antennas,
the first code word is obtained via a formula including a third code word which does not comprise the phase shifts and amplitude differences among the plurality of groups of cross-polarized linear array antennas, and
the second code word is obtained via a formula including a fourth code word which does not comprise the phase shifts and amplitude differences among the plurality of groups of cross-polarized linear array antennas.

8. The obtaining device according to claim 7, wherein the plurality of groups of cross-polarized linear array antennas are two groups of single stream antennas, the first code word and the second code word are obtained via following formulas:

$$w_1 = d_1 w_3, \quad d_1 = \text{diag}[\underbrace{1, \ldots, 1}_{N}, \underbrace{a_1, \ldots, a_1}_{N}]; \text{ and}$$

$$w_2 = d_2 w_4, \quad d_2 = \text{diag}[\underbrace{1, \ldots, 1}_{N}, \underbrace{a_2, \ldots, a_2}_{N}],$$

wherein, $w_1$ is the first code word, $w_3$ is a third code word which does not comprise the phase shifts and/or amplitude differences among the plurality of groups of cross-polarized linear array antennas, $w_2$ is the second code word, $w_4$ is a fourth code word which does not comprise the phase shifts and/or amplitude differences among the plurality of groups of cross-polarized linear array antennas, N is antenna number of each group of antennas, $a_1$ and $a_2$ are the phase shifts and/or amplitude differences.

9. The obtaining device according to claim 7, wherein the plurality of groups of cross-polarized linear array antennas are two groups of two-stream antennas, the first code word and the second code word are obtained via following formulas:

$$w_1 = [d_{11} w_{31}, d_{12} w_{32}],$$

$$d_{11} = \text{diag}[\underbrace{1, \ldots, 1}_{N}, \underbrace{a_1, \ldots, a_1}_{N}],$$

$$d_{12} = \text{diag}[\underbrace{a_1^*, \ldots, a_1^*}_{N}, \underbrace{1, \ldots, 1}_{N}];$$

and $$w_2 = d_2 w_4, \quad d_2 = \text{diag}[\underbrace{1, \ldots, 1}_{N}, \underbrace{a_2, \ldots, a_2}_{N}],$$

wherein, $w_1$ is the first code word, $[w_{31}, w_{32}]$ is a third code word which does not comprise the phase shifts and/or amplitude differences among the plurality of groups of cross-polarized linear array antennas, $w_2$ is the second code word, $w_4$ is a fourth code word which does not comprise the phase shifts and/or amplitude differences among the plurality of groups of cross-polarized linear array antennas, N is antenna number of each group of antennas, $a_1$ and $a_2$ are the phase shifts and/or amplitude differences.

10. A providing device, in a user terminal equipment, for providing a network apparatus with a precoding matrix, wherein the precoding matrix is obtained according to a first code word and a second code word, the network apparatus comprises a plurality of groups of cross-polarized linear array antennas, the providing device comprises:
a processing element configured to send first channel indicating information indicating the first code word, and sending second channel indicating information indicating the second code word,
wherein, the first code word and/or the second code word comprises phase shifts and/or amplitude differences among the plurality of groups of cross-polarized linear array antennas,
the first code word is obtained via a formula including a third code word which does not comprise the phase shifts and amplitude differences among the plurality of groups of cross-polarized linear array antennas, and the second code word is obtained via a formula including a fourth code word which does not comprise the phase shifts and amplitude differences among the plurality of groups of cross-polarized linear array antennas.

11. The providing device according to claim 10, wherein the plurality of groups of cross-polarized linear array antennas are two groups of single stream antennas, the first code word and the second code word are obtained via following formulas:

$$w_1 = d_1 w_3, \ d_1 = \mathrm{diag}[\underbrace{1, \ldots, 1}_{N}, \underbrace{a_1, \ldots, a_1}_{N}]; \text{ and}$$

$$w_2 = d_2 w_4, \ d_2 = \mathrm{diag}[\underbrace{1, \ldots, 1}_{N}, \underbrace{a_2, \ldots, a_2}_{N}],$$

wherein $w_1$ is the first code word, $w_3$ is a third code word which does not comprise the phase shifts and/or amplitude differences among the plurality of groups of cross-polarized linear array antennas, $w_2$ is the second code word, $w_4$ is a fourth code word which does not comprise the phase shifts and/or amplitude differences among the plurality of groups of cross-polarized linear array antennas, N is antenna number of each group of antennas, $a_1$ and $a_2$ are the phase shifts and/or amplitude differences.

12. The providing device according to claim 10, wherein the plurality of groups of cross-polarized linear array antennas are two groups of two-stream antennas, the first code word and the second code word are obtained via following formulas:

$$w_1 = [d_{11} w_{31}, d_{12} w_{32}],$$

$$d_{11} = \mathrm{diag}[\underbrace{1, \ldots, 1}_{N}, \underbrace{a_1, \ldots, a_1}_{N}],$$

$$d_{12} = \mathrm{diag}[\underbrace{a_1^*, \ldots, a_1^*}_{N}, \underbrace{1, \ldots, 1}_{N}];$$

and $$w_2 = d_2 w_4, \ d_2 = \mathrm{diag}[\underbrace{1, \ldots, 1}_{N}, \underbrace{a_2, \ldots, a_2}_{N}],$$

wherein, $w_1$ is the first code word, $[w_{31}, w_{32}]$ is a third code word which does not comprise the phase shifts and/or amplitude differences among the plurality of groups of cross-polarized linear array antennas, $w_2$ is the second code word, $w_4$ is a fourth code word which does not comprise the phase shifts and/or amplitude differences among the plurality of groups of cross-polarized linear array antennas, N is antenna number of each group of antennas, $a_1$ and $a_2$ are the phase shifts and/or amplitude differences.

* * * * *